United States Patent
Komuta (10) Patent No.: US 8,147,329 B2
(45) Date of Patent: Apr. 3, 2012

(54) GAME DEVICE, CONTROL METHOD FOR THE GAME DEVICE, AND INFORMATION STORAGE MEDIUM

(75) Inventor: Osamu Komuta, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1109 days.

(21) Appl. No.: 11/885,582

(22) PCT Filed: Feb. 7, 2006

(86) PCT No.: PCT/JP2006/302035
§ 371 (c)(1),
(2), (4) Date: Sep. 4, 2007

(87) PCT Pub. No.: WO2006/092935
PCT Pub. Date: Sep. 8, 2006

(65) Prior Publication Data
US 2008/0194325 A1 Aug. 14, 2008

(30) Foreign Application Priority Data
Mar. 3, 2005 (JP) .................. 2005-059574

(51) Int. Cl.
A63F 13/00 (2006.01)
(52) U.S. Cl. ................. 463/31; 463/33; 463/34; 463/40
(58) Field of Classification Search .................. 463/31, 463/33, 34, 40
See application file for complete search history.

(56) References Cited

U.S. PATENT DOCUMENTS

| | | | |
|---|---|---|---|
| 6,992,648 B2* | 1/2006 | Yamada | 345/88 |
| 7,648,415 B2* | 1/2010 | Izuno et al. | 463/31 |
| 2001/0008398 A1* | 7/2001 | Komata | 345/156 |
| 2004/0214638 A1* | 10/2004 | Totaka et al. | 463/35 |
| 2005/0227762 A1* | 10/2005 | Tahara et al. | 463/30 |
| 2007/0293313 A1* | 12/2007 | Shimizu et al. | 463/31 |

FOREIGN PATENT DOCUMENTS

| | | |
|---|---|---|
| JP | 10-261099 A | 9/1998 |
| JP | 2002-166053 A | 6/2002 |
| JP | 2003-225468 A | 8/2003 |

OTHER PUBLICATIONS

"Ragnarok Online-Ragnarok Online, Online Player", Mainichi Communications Inc., Nov. 8, 2002, p. 36, vol. 12, vol. 9, No. 22.

* cited by examiner

*Primary Examiner* — Pierre Eddy Elisca
*Assistant Examiner* — Shahid Kamal
(74) *Attorney, Agent, or Firm* — Sughrue Mion, PLLC (57) ABSTRACT

To provide a game device capable of reducing stress felt by a player in a case of determining a moving destination position of a moving instruction object image. A display unit (84) displays a game screen containing the moving instruction object image and a moving target candidate image. A determining unit (an enemy unit selecting unit (76)) determines whether or not a moving destination candidate position accepted by a moving destination candidate accepting unit (74) and a position of the moving target candidate image satisfy predetermined positional conditions. A display control unit (82) performs display output associated with the moving target candidate image based on parameter information corresponding to the moving target candidate image and parameter information corresponding to the moving instruction object image in accordance with a result of the determination made by the determining unit.

12 Claims, 9 Drawing Sheets

| ID | CURRENT POSITION | HIT POINT | MOVING ABILITY | ATTACKING ABILITY | ATTACKABLE RANGE | DEFENDING ABILITY |
|---|---|---|---|---|---|---|
| P1 | ... | ... | ... | ... | ... | ... |
| P2 | ... | ... | ... | ... | ... | ... |
| E1 | ... | ... | ... | ... | ... | ... |
| E2 | ... | ... | ... | ... | ... | ... |
| E3 | ... | ... | ... | ... | ... | ... |
| E4 | ... | ... | ... | ... | ... | ... |
| E5 | ... | ... | ... | ... | ... | ... |

FIG. 10

| ID | MESSAGE CHARACTER STRING | SHAPE |
|----|--------------------------|-------|
| 1 | "I'LL ATTACK YOU" | 1 |
| 2 | "I'LL COUNTERATTACK AGAINST YOU" | 2 |
| 3 | "I'LL STAND" | 1 |
| 4 | "HELP" | 3 |

GAME DEVICE, CONTROL METHOD FOR THE GAME DEVICE, AND INFORMATION STORAGE MEDIUM

TECHNICAL FIELD

The present invention relates to a game device, a control method for the game device, and an information storage medium.

BACKGROUND ART

Such a game is known where a moving instruction object image and a moving target candidate image are displayed on a game screen, and the moving instruction object image is moved to a moving destination position determined by a player. Such a type of simulation game is also known where, for example, at least one operation object unit and a plurality of enemy units are displayed on the game screen, and the operation object unit moves and attacks the enemy unit in accordance with instructions given from the player.

It is general practice in the game described above that the player determines, while taking account of a relationship between parameter information associated with the moving instruction object image and parameter information associated with the moving target candidate image, the moving destination position of the moving instruction object image. For instance, it is also general practice in the simulation game described above for the player, when moving the operation object unit, to determine the moving destination position of the operation object unit in a way that takes account of "to which enemy unit an attack can be made", "whether the hit point of the enemy unit can be zeroed by the attack", "which enemy unit is likely to attack the operation object unit in the next enemy's turn", and so on.

As to this point, the game given above entails, in order for a player to acquire information needed for determining the moving destination position, when a cursor image used for the player to designate the moving destination position moves to a position of a moving instruction object image or to a position of a moving target candidate image, displaying parameter information associated with the moving instruction object image or the moving target candidate image on the game screen. For example, the simulation game involves displaying, when the cursor image moves to the position of the operation object unit or to the position of the enemy unit, parameter information (such as a hit point, a moving ability parameter, an attacking ability parameter, an attackable range parameter, a defending ability parameter, or the like) of the operation object unit or the enemy unit on the game screen.
[Patent Document 1] JP 2002-166053 A

DISCLOSURE OF THE INVENTION

Problem to be Solved by the Invention

The acquisition of the information needed for determining the moving destination position of the moving instruction object image, however, requires the player to move the cursor image to the position of the moving instruction object image and to the position of the moving target candidate image, with the result that the player might feel stress.

The present invention has been made in view of the problem given above, and aims at providing a game device, a control method for the game device, and an information storage medium that are capable of reducing the stress felt by the player in the case of determining the moving destination position of the moving instruction object image.

Means for Solving the Problem

To solve the problem given above, according to one aspect of the present invention, there is provided a game device which displays a game screen containing a moving instruction object image and a moving target candidate image, including: moving destination candidate designation accepting means for accepting designation of a moving destination candidate position of the moving instruction object image; determining means for determining whether or not the moving destination candidate position and a position of the moving target candidate image satisfy predetermined conditions; and display control means for performing a display output associated with the moving target candidate image on the basis of parameter information corresponding to the moving target candidate image and parameter information corresponding to the moving instruction object image, according to a result of the determination made by the determining means.

Further, according to another aspect of the present invention, there is provided a control method for a game device which displays a game screen containing a moving instruction object image and a moving target candidate image, including: a moving destination candidate designation accepting step of accepting designation of a moving destination candidate position of the moving instruction object image; a determining step of determining whether or not the moving destination candidate position and a position of the moving target candidate image satisfy predetermined conditions; and a display control step of performing a display output associated with the moving target candidate image on the basis of parameter information corresponding to the moving target candidate image and parameter information corresponding to the moving instruction object image, according to a result of the determination made in the determining step.

Further, according to still another aspect of the present invention is a program for making a computer such as a home game machine, a commercial game machine, a portable game machine, a mobile phone, a personal computer, a server computer, or the like, function as a game device that displays a game screen containing a moving instruction object image and a moving target candidate image, the program making the computer function as: moving destination candidate designation accepting means for accepting designation of a moving destination candidate position of the moving instruction object image; determining means for determining whether or not the moving destination candidate position and the position of the moving target candidate image satisfy predetermined conditions; and display control means for performing a display output associated with the moving target candidate image on the basis of parameter information corresponding to the moving target candidate image and parameter information corresponding to the moving instruction object image, according to a result of the determination made by the determining means.

Further, according to yet another aspect of the present invention is a computer-readable information storage medium storing the program described above. Still further, a program distribution device according to the present invention is a program distribution device which includes an information storage medium storing the above program, reads the program from the information storage medium and distributes the program. Yet further, a program distribution method according to the present invention is a program distribution method of reading a program from an information storage medium storing the above program, and distributing the program.

The present invention relates to a game device for displaying a game screen containing a moving instruction object image and a moving target candidate image. In the present invention, designation of a moving destination candidate position of the moving instruction object image is accepted. Further, it is determined whether or not the moving destination candidate position and the position of the moving target candidate image satisfy predetermined conditions. Then, a display output associated with the moving target candidate image is performed according to the result of determination based on parameter information corresponding to the moving target candidate image and parameter information corresponding to the moving instruction object image. According to the present invention, stress felt by the player in the case of determining the moving destination position of the moving instruction object image can be reduced.

In one example of the present invention, the display control means may control a guide image, which is based on the parameter information corresponding to the moving target candidate image and the parameter information corresponding to the moving instruction object image, to be displayed at a position determined based on the position of the moving target candidate image in accordance with the result of the determination by the determining means.

In the above, the guide image may include a message character string based on the parameter information corresponding to the moving target candidate image and the parameter information corresponding to the moving instruction object image.

Further, in the above, the guide image may be a balloon image with a balloon containing the message character string; and the display control means may determine a balloon shape on the basis of the parameter information corresponding to the moving target candidate image and the parameter information corresponding to the moving instruction object image.

In another example of the present invention, a plurality of moving target candidate images may be displayed on the game screen; the determining means may determine, with respect to each of the plurality of moving target candidate images, whether or not the position of the moving target candidate image and the moving destination candidate position satisfy the predetermined conditions; and the display control means may perform a display output associated with each of the moving target candidate images that has been determined to satisfy the predetermined positional conditions by the determining means based on the parameter information corresponding to the moving target candidate image and the parameter information corresponding to the moving instruction object image.

BEST MODE FOR CARRYING OUT THE INVENTION

An in-depth description of an example of an embodiment of the present invention will hereinafter be made based on the drawings.

Figure 1:
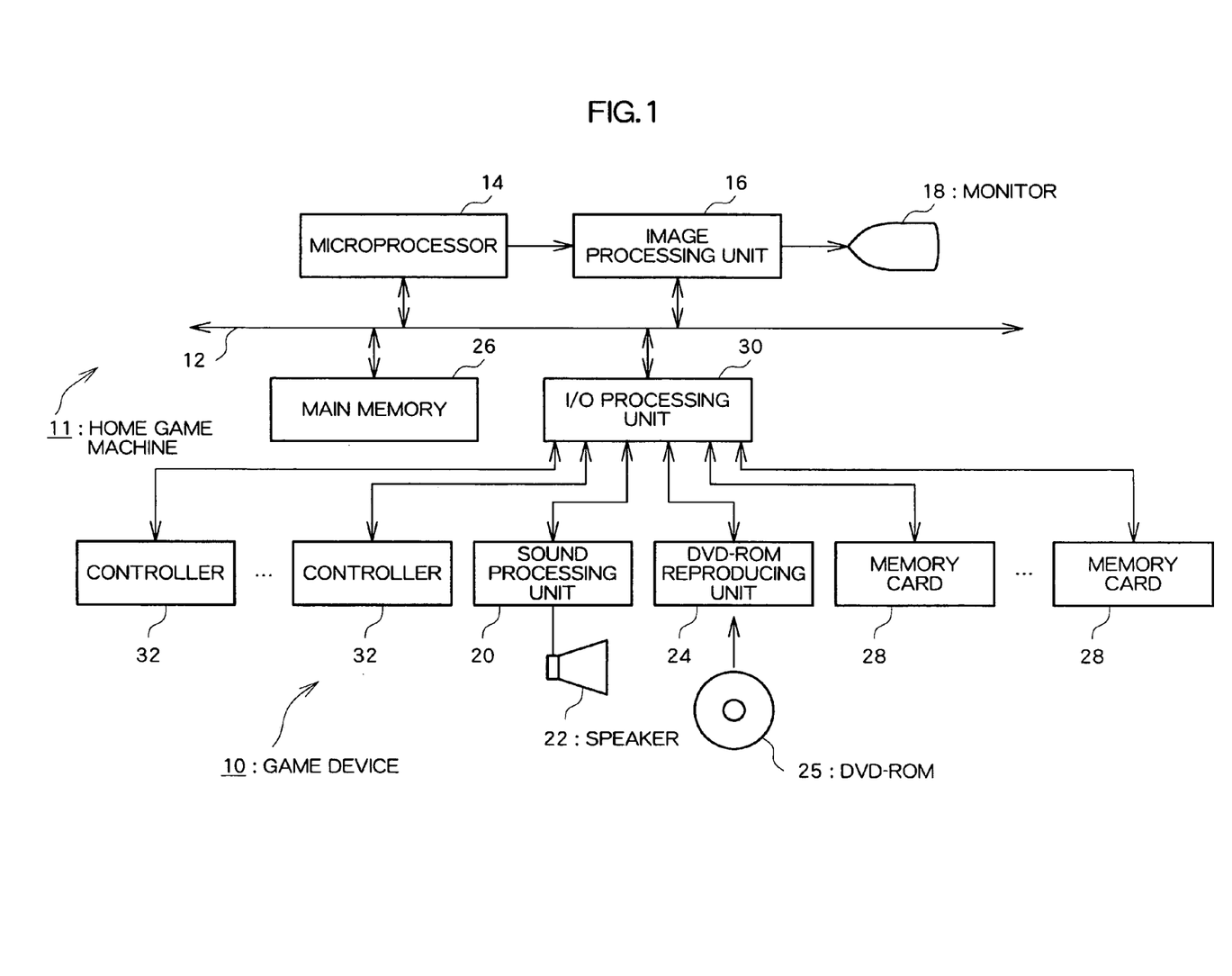
FIG. 1 is a diagram showing a hardware structure of a game device according to an embodiment of the present invention.

FIG. 1 is a diagram illustrating a hardware structure of a game device according to the embodiment of the present invention. A game device 10 illustrated in FIG. 1 has a structure in which a DVD-ROM 25 as an information storage medium and memory cards 28 are inserted into a home game machine 11, and a monitor 18 and a speaker 22 are connected to the home game machine 11. For example, a domestic TV receiving set is used for the monitor 18, and a built-in speaker thereof is used for the speaker 22.

The home game machine 11 is a well-known computer game system comprising a bus 12, a microprocessor 14, an image processing unit 16, a sound processing unit 20, a DVD-ROM reproducing unit 24, a main memory 26, an input/output (I/O) processing unit 30, and controllers 32. An enclosure accommodates the components other than the controllers 32.

The bus 12 is used for exchanging addresses and/or data among the respective units of the home game machine 11. The microprocessor 14, the image processing unit 16, the main memory 26, and the I/O processing unit 30 are connected to each other via the bus 12 so as to be communicable with each other.

The microprocessor 14 controls the individual units of the home game machine 11 on the basis of an operating system (OS) stored in a ROM (not shown), a program read from the DVD-ROM 25, and the data read from the memory card 28. The main memory 26 comprises, for example, a RAM, and the program read from the DVD-ROM 25 and the data read from the memory card 28 are written in the main memory 26 if necessary. The main memory 26 is also employed as a working memory for the microprocessor 14.

The image processing unit 16 comprises a VRAM and renders, based on the image data sent from the microprocessor 14, a game screen in the VRAM. Then, the image processing unit 16 converts a content thereof into video signals and outputs the video signals to the monitor 18 at predetermined timings.

The I/O processing unit 30 is an interface used for the microprocessor 14 to access the sound processing unit 20, the DVD-ROM reproducing unit 24, the memory card 28, and the controller 32. The sound processing unit 20, the DVD-ROM reproducing unit 24, the memory card 28, and the controller 32 are connected to the I/O processing unit 30.

The sound processing unit 20 comprises a sound buffer, and reproduces and outputs, via the speaker 22, various sound data such as game music, game sound effects, messages, and so forth, read from the DVD-ROM 25 and stored in the sound buffer.

The DVD-ROM reproducing unit 24 reads a program from the DVD-ROM 25 in accordance with an instruction given from the microprocessor 14. It is to be noted that the DVD-ROM 25 is used for supplying the program to the home game machine 11. However, any other various information storage media such as CD-ROMs, ROM cards, or the like, may also be used. Further, the program may also be supplied to the home game machine 11 from a far-off area via a data communication network such as the Internet, or the like.

The memory card 28 comprises a nonvolatile memory (e.g., an EEPROM, or the like). The home game machine 11 has a plurality of memory card slots into which the memory cards 28 are inserted, and the plurality of memory cards 28 can be simultaneously inserted. The memory card 28 is constructed so that the memory card 28 can be inserted into and removed from the memory card slot, and is employed for storing various game data such as save data, or the like.

The controller 32 is a general-purpose operation input means used for a player to input various game operations. The I/O processing unit 30 scans statuses of the respective portions of the controller 32 at an interval of a fixed period (e.g., every 1/60 sec), and transfers operation signals representing scanned results to the microprocessor 14 via the bus 12. The microprocessor 14 determines, based on this operation signal, the game operation by the player. The home game machine 11 is configured to be connectable with the plurality of controllers 32, and the microprocessor 14 performs the game control on the basis of the operation signals inputted from the respective controllers 32.

Figure 2:
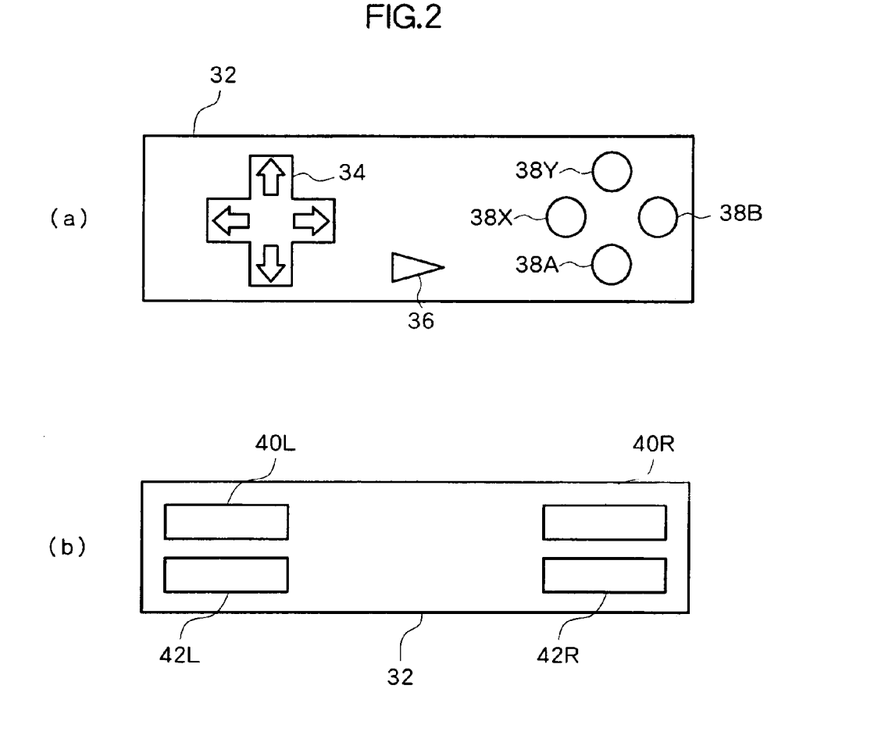
FIG. 2 is diagram showing an example of a controller.

FIG. 2 is diagram illustrating an example of the controller 32. The controller 32 illustrated in the figure is a general-purpose game controller. As shown in FIG. 2(*a*), the surface of the controller 32 is provided with a direction button 34, a start button 36, and buttons 38X, 38Y, 38A, and 38B. Further, as illustrated in FIG. 2(*b*), the buttons 42L, 42R, formed on the top surface on the left and right sides thereof closer to the front surface, and the buttons 40L, 40R, similarly formed but closer to the rear surface. The direction button 34 has a cross-shape and is normally used for designating a moving direction of a character or a cursor. The start button 36 is a small-sized push button having a triangular shape and is normally used for starting or forcibly ending the game. The buttons 38X, 38Y, 38A, 38B, 40L, 40R, 42L, and 42R are used for other game operations.

The game device 10 having the hardware structure described above provides a simulation game, in which, through execution of the game program read from the DVD-ROM 25 by the microprocessor 14, the player gives instructions relating to a move, an attack, or the like, to operation object units belonging to a player team (which will hereinafter be referred to as player units) to aim at zeroing a hit point of units belonging to an enemy team operated by a computer (which will hereinafter be referred to as enemy units).

This simulation game proceeds by a turn in which the player gives instructions to player units (which will hereinafter be referred to as player's turn) and a turn in which the computer gives instructions to the enemy unit (which will hereinafter be referred to as enemy's turn) come alternately.

In the player's turn, the player gives action instructions such as "move", "attack", or the like, to the player unit. To be specific, the player selects the player unit to which the action instruction is to be given (action instruction object player unit). Then, the player gives the moving instruction to the player unit to move to a position at which an attack can be made on the enemy unit. Further, the player gives an instruction to the player unit, which has moved to the position at which the attack can be made on the enemy unit, to attack the enemy unit.

Figure 3:
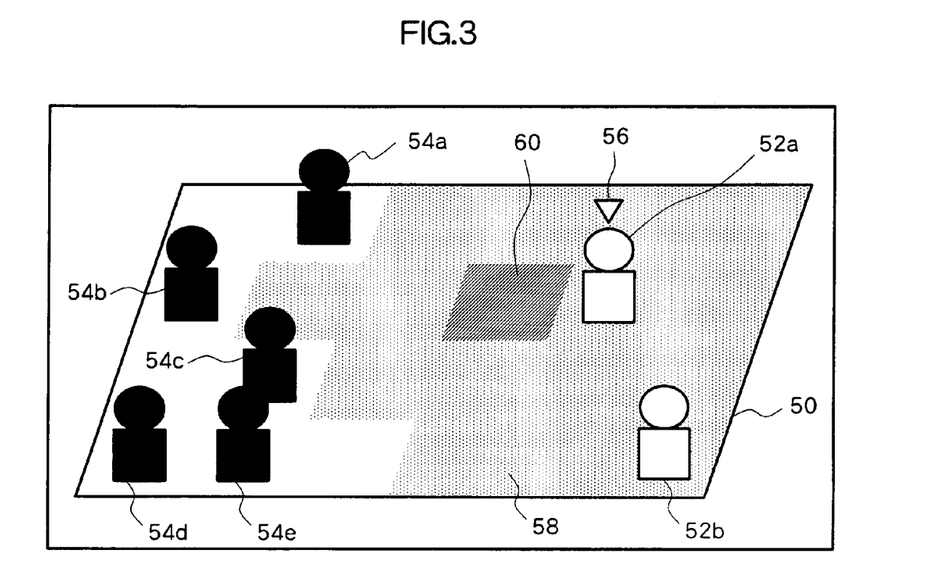
FIG. 3 is a diagram showing an example of a game screen.
Figure 4:
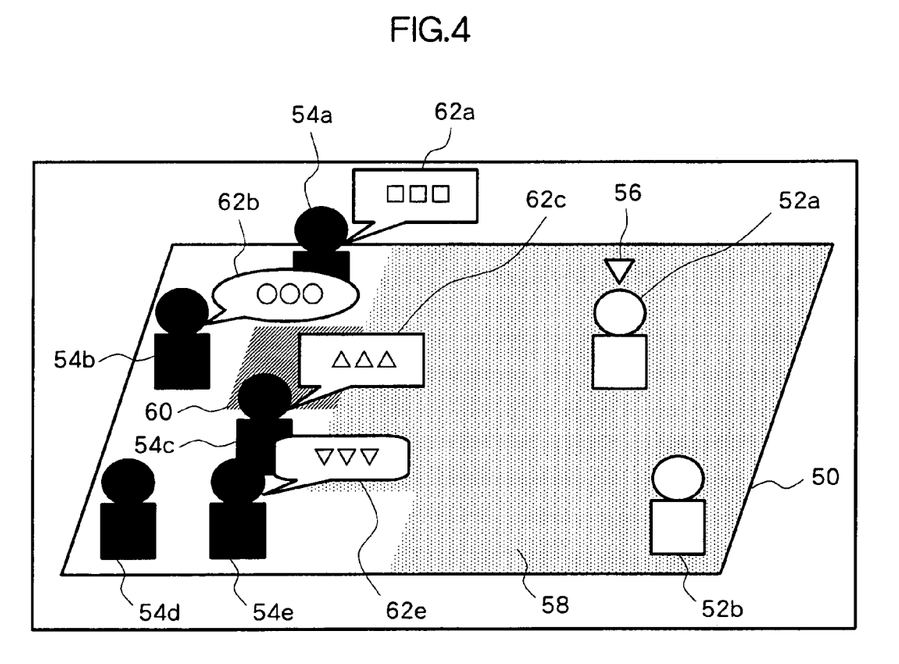
FIG. 4 is a diagram showing an example of the game screen.
Figure 5:
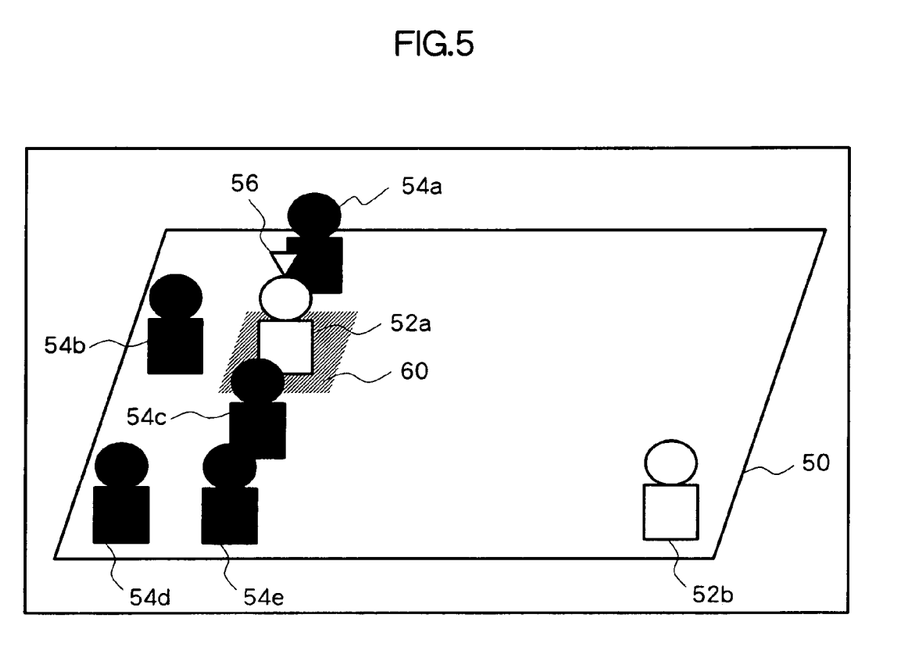
FIG. 5 is a diagram showing an example of the game screen.

FIGS. 3 to 5 each illustrate an example of the game screen in the case of giving the moving instruction to the player unit in the player's turn. More specifically, FIGS. 3 through 5 each show an example of the game screen in the case of determining a moving destination of the player unit.

As illustrated in FIG. 3, a game field image 50 is displayed on the game screen. Further, player unit images 52*a* and 52*b* and enemy unit images 54*a*, 54*b*, 54*c*, 54*d*, and 54*e* are displayed on the game screen. Still further, a marker image 56 is displayed above the player unit image 52*a* on the game screen illustrated in FIG. 3. The marker image 56 indicates the instruction object player unit image. Specifically, on the game screen shown in FIG. 3, the player unit image 52*a* is defined as a moving instruction object. In other words, the game screen illustrated in FIG. 3 is a screen for determining the moving destination of the player unit image 52*a*. Moreover, a movable range guide image 58 is displayed on the game screen. The movable range guide image 58 is displayed over the game field image 50, and serves to indicate the movable range of the player unit image 52*a* as the moving instruction object. Yet further, a cursor image 60 is displayed on the game screen. The cursor image 60 moves across the game field image 50 in accordance with the operation of the direction button 34. On the game screen in a state shown in FIG. 3, the player moves the cursor image 60 to a moving destination candidate position of the player unit image 52*a* by operating the direction button 34.

FIG. 4 illustrates the game screen in a case where the player moves the cursor image 60 to a field section of a desired moving destination candidate position. As illustrated in FIG. 4, balloon images 62*a*, 62*b*, 62*c*, and 62*e* are displayed on the game screen in this case. The balloon image 62*a* is a balloon image corresponding to the enemy unit image 54*a*. Similarly, the balloon images 62*b*, 62*c*, and 62*e* are balloon images corresponding to the enemy unit images 54*b*, 54*c*, and 54*e*, respectively. Note that in the example of FIG. 4, no balloon image corresponds to the enemy unit image 54*d*.

The balloon image is displayed so as to correspond to (1) the enemy unit that cannot be attacked by the moving instruction object player unit from the moving destination candidate position but is capable of attacking an object at the moving destination candidate position (more precisely, the player unit located at the moving destination candidate position) in the next enemy's turn, or (2) the enemy unit that can be attacked by the moving instruction object player unit from the moving destination candidate position.

For instance, the balloon image corresponding to the former enemy unit has a line such as "I'll attack you" etc displayed in the balloon.

Further, for example, in the balloon image corresponding to "the enemy unit whose hit point is presumed not to become zero even when attacked by the moving instruction object player unit and which is capable of attacking an object at the moving destination candidate position (more accurately, the player unit located at the moving destination candidate position) in the next enemy's turn" among the latter enemy units, a line expressing an aggressive feeling such as "I'll counter-attack against you" etc. is displayed in the balloon. In this case, a balloon shape of the balloon image is formed in a shape that expresses the aggressive feeling.

Further, for instance, the balloon image corresponding to "the enemy unit whose hit point is presumed not to become zero even when attacked by the moving instruction object player unit and which is incapable of attacking an object at the moving destination candidate position in the next enemy's turn" among the latter enemy units, has a line such as "I'll stand" etc. displayed in the balloon.

Moreover, for example, the balloon image corresponding to "the enemy unit whose hit point is presumed to become zero when attacked by the moving instruction object player unit" among the latter enemy units, has a line expressing a weak-spirited feeling such as "Help" etc. displayed in the balloon. In this case, the balloon shape of the balloon image is formed in a shape expressing the weak-spirited feeling.

When the player performs a predetermined determining operation (e.g., an operation of pressing the button 38A), the moving destination candidate position at this point in time is determined as the moving destination position. Then, for example, the game screen as illustrated in FIG. 5 is displayed. On this game screen, the player unit image 52a is instructed to attack the adjacent enemy unit. It is to be noted that as shown in FIG. 5, in this embodiment, the balloon image disappears at a timing at which the moving destination position of the moving instruction object player unit is determined. However, the balloon image may remain to be displayed even after determination of the moving destination position.

In the game device 10, by displaying the balloon image, the player can grasp at a glance from the contents and shapes of the balloon images, information on "to which enemy unit an attack can be made", "whether the hit point of the enemy unit can be zeroed by the attack", "which enemy unit is likely to attack the moving instruction object player unit in the next enemy's turn", and so on if the moving instruction object player unit (player unit image 52a) is moved to the moving destination candidate position. In other words, the player can comparatively easily obtain the information needed for determining the moving destination position of the player unit.

Figure 6:
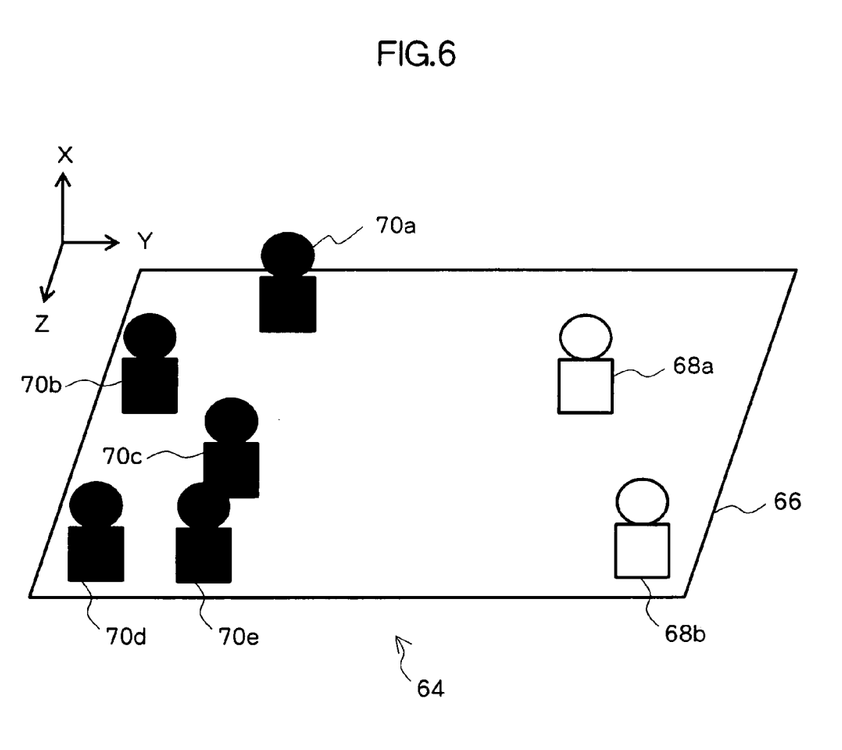
FIG. 6 is a perspective view showing an example of a virtual three-dimensional space.
Figure 7:
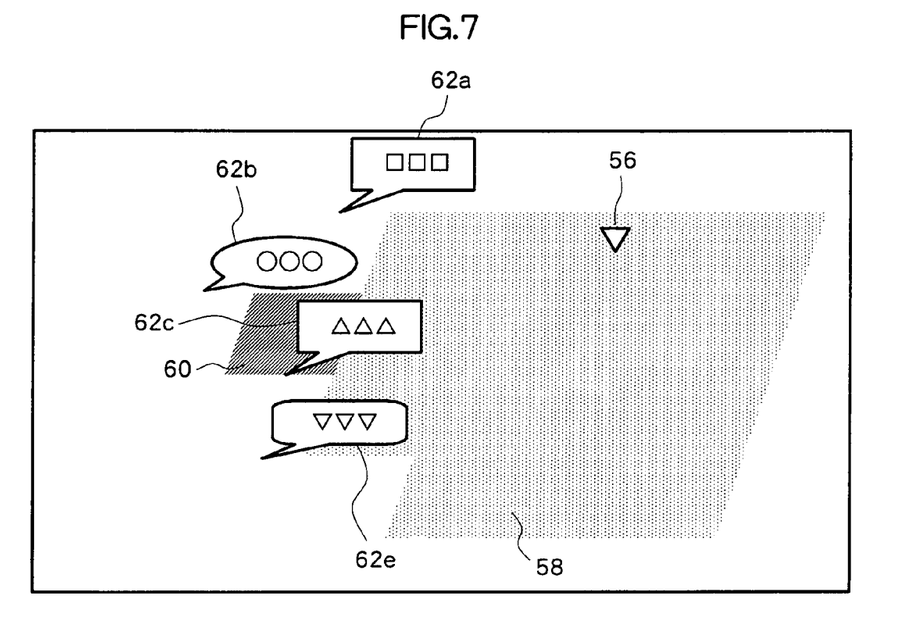
FIG. 7 is a diagram showing an example of an image for synthesis.

Note that a virtual three-dimensional space as illustrated in FIG. 6 is constructed in the main memory 26 in order to create the game screen as shown in FIGS. 3 through 5. As illustrated in FIG. 6, a game field object 66 is arranged in the virtual three-dimensional space 64. Further, player unit objects 68a and 68b and enemy unit objects 70a, 70b, 70c, 70d, and 70e are arranged on the game field object 66. The game device 10 creates a field-of-view image obtained by viewing the virtual three-dimensional space 64 from a given viewpoint in a given sight line direction. Moreover, the game device 10 creates a full-transparency image for synthesis, which has the same size as the field-of-view image. The image for synthesis is attached with the marker image 56, the movable range guide image 58, and the cursor image 60. The image for synthesis is eventually organized into an image as illustrated in FIG. 7. Then, an image obtained by synthesizing the field-of-view image and the image for synthesis is created in the VRAM of the game device 10. The image created in the VRAM is displayed as the game screen on the monitor 18 at a predetermined timing.

Figure 8:
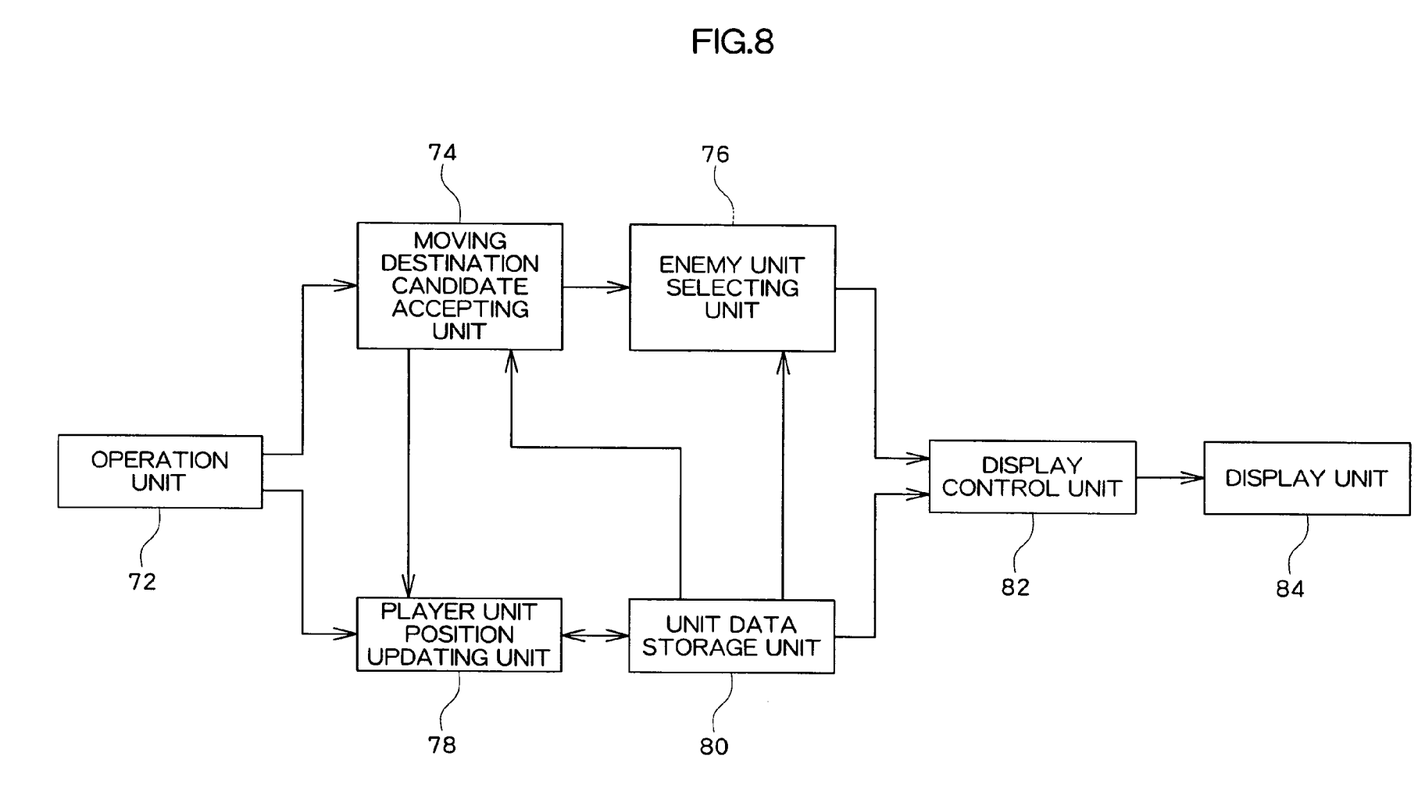
FIG. 8 is a diagram showing functional blocks of the game device according to the embodiment of the present invention.

Given herein is a description of a functional configuration of the game device 10. FIG. 8 mainly shows functional blocks related to the present invention in the functional blocks realized in the game device 10. As shown in FIG. 8, the game device 10 includes an operation unit 72, a moving destination candidate accepting unit 74, an enemy unit selecting unit 76, a player unit position updating unit 78, a unit data storage unit 80, a display control unit 82, and a display unit 84. Those functions are realized by the microprocessor 14 executing the program supplied via the DVD-ROM 25.

[1. Unit Data Storage Unit]

The unit data storage unit 80 is realized mainly with the DVD-ROM 25 and the main memory 26. The unit data storage unit 80 stores the data regarding the player units and the data regarding the enemy units. For instance, the unit data storage unit 80 stores items of parameter information, object data, etc. of the respective units.

Figure 9:
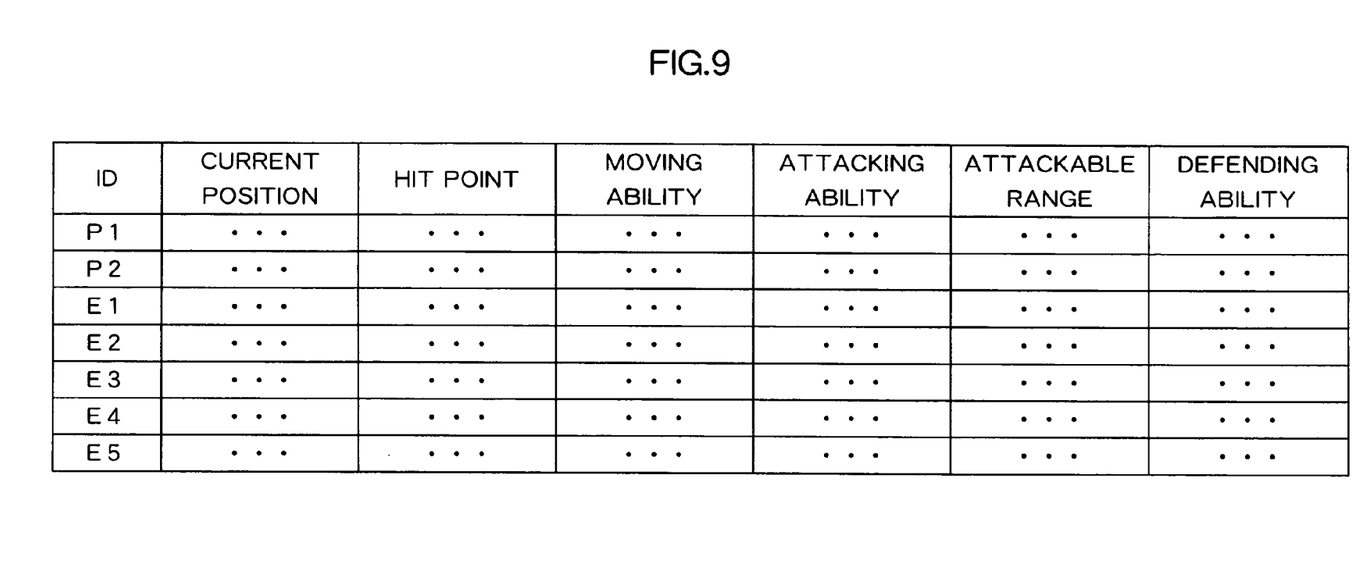
FIG. 9 is a diagram showing an example of a unit table.

In this embodiment, for example, a unit table as shown in FIG. 9 is stored in the unit data storage unit 80. The unit table shown in FIG. 9 contains an ID field, a current position field, a hit point field, a moving ability field, an attacking ability field, an attackable range field and a defending ability field. The ID field stores identification information (ID) for uniquely identifying each unit. Note that in FIG. 9, a first letter of the ID serves as information indicating which unit of the player unit (P) or the enemy unit (E) the unit corresponds to.

The current position field stores information (parameter) specifying the current position of the unit. The current position field may also store information specifying a position of the unit on the game screen (i.e., unit image display position) or may further store information specifying a position of the unit in the virtual three-dimensional space 64 (i.e., unit object position). This embodiment will give an exemplification on the assumption that the information specifying the position of the unit in the virtual three-dimensional space 64 is stored in the current position field.

The hit point field stores a hit point of the unit. The hit point is a parameter indicating a physical strength and a vital force of the unit. When the hit point comes to 0, the action instruction for the unit is restricted. The moving ability field stores a moving ability parameter. The moving ability parameter is defined as numerical information representing a movable distance of the unit in one turn (corresponding to one moving instruction).

The attacking ability field stores an attacking ability parameter. The attacking ability parameter is defined as numerical information representing an attacking ability of the unit. For instance, if the player unit attacks the enemy unit, a magnitude of the damage (hit point reduction quantity) to the enemy unit is determined based on the attacking ability parameter of the player unit.

The attackable range field stores an attackable range parameter. The attackable range parameter is defined as numerical information representing an attackable range of the unit. In other words, each player unit can attack the enemy units located within the range determined based on the attackable range parameter from the current position. Each enemy unit can attack the player units located within the range determined based on the attackable range parameter from the current position. Note that the attackable range parameter may also be a parameter indicating a distance on the game screen or may further be a parameter indicating a distance in the virtual three-dimensional space 64. This embodiment will give an exemplification on the assumption that the attackable range parameter indicates the distance in the virtual three-dimensional space 64.

The defending ability field stores a defending ability parameter. The defending ability parameter is defined as numerical information representing a defending ability of the unit. For example, if the player unit attacks the enemy unit, a magnitude of the damage (hit point reduction quantity) to the enemy unit is determined based on the defending ability parameter of the enemy unit. Moreover, if the player unit is attacked by the enemy unit, a magnitude of the damage (hit point reduction quantity) to the player unit is determined based on the defending ability parameter of the player unit.

[2. Operation Unit]

The operation unit 72 is realized mainly with the controller 32 and the I/O processing unit 30. The operation unit 72 supplies operation signals indicating operation statuses of respective operation members of the controller 32 to the moving destination candidate accepting unit 74 and to the player unit position updating unit 78.

[3. Moving Destination Candidate Accepting Unit]

The moving destination candidate accepting unit 74 accepts designation of the moving destination candidate position of the moving instruction object player unit. The moving destination candidate accepting unit 74 may accept a position on the game screen as the moving destination candidate position, or may accept a position in the virtual three-dimensional space 64 as the moving destination candidate position.

The moving destination candidate accepting unit 74 according to this embodiment causes the cursor image 60 to be displayed on the game screen for guiding the player to designate the moving destination candidate position. When a direction instructing operation signal (operation signal indicating that a direction instructing operation has been made on the controller 32) is inputted from the operation unit 72, the moving destination candidate accepting unit 74 updates the position of the cursor image 60 and stores a position in the virtual three-dimensional space 64, which corresponds to the position of the cursor image 60, as the moving destination candidate position. Note that the display position of the cursor image 60 may, as described above, also be stored as the moving destination candidate position.

[4. Enemy Unit Selecting Unit]

The enemy unit selecting unit 76 (determining means) determines, with respect to each of the plurality of enemy unit images (moving target candidate images), whether or not the position of the enemy unit image and the moving destination candidate position acquired by the moving destination candidate accepting unit 74 satisfy predetermined conditions. More specifically, the enemy unit selecting unit 76 determines whether or not an area based on the moving destination candidate position acquired by the moving destination candidate accepting unit 74 contains the position of each enemy unit image. For example, when the moving destination candidate position acquired by the moving destination candidate accepting unit 74 indicates a position on the game screen, the enemy unit selecting unit 76 determines whether or not the moving destination candidate position and the display position of each enemy unit image on the game screen satisfy the predetermined conditions. Further, for instance, when the moving destination candidate position acquired by the moving destination candidate accepting unit 74 indicates the position in the virtual three-dimensional space 64, the enemy unit selecting unit 76 determines whether or not the moving destination candidate position and the position in the virtual three-dimensional space 64 (i.e., position of each enemy unit object) corresponding to the position of each enemy unit image on the game screen satisfy the predetermined conditions. The enemy unit selecting unit 76 selects one or multiple enemy unit images that satisfy the predetermined conditions from the plurality of enemy unit images. Note that the selection by the enemy unit selecting unit 76 is executed each time the moving destination candidate accepting unit 74 accepts the moving destination candidate position.

[5. Player Unit Position Updating Unit]

The player unit position updating unit 78 (position updating means) determines, when the predetermined determining operation signal (operation signal indicating that a determining operation has been made on the controller 32) is inputted from the operation unit 72, the moving destination candidate position accepted by the moving destination candidate accepting unit 74 as the moving destination position of the moving instruction object player unit, and updates the position of the moving instruction object player unit. To be specific, the player unit position updating unit 78 updates, in the unit table, the current position field of the moving instruction object player unit.

[6. Display Control Unit and Display Unit]

The display control unit 82 is realized mainly with the image processing unit 16. The display unit 84 is realized mainly with the monitor 18. The display control unit 82 causes the game screen containing the player unit image and the plurality of enemy unit images to be displayed on the display unit 84.

Particularly, the display control unit 82 makes the display unit 84 conducts a display output related to every enemy unit selected by the enemy unit selecting unit 76 on the basis of the parameter information corresponding to the enemy unit and the parameter information corresponding to the moving instruction object player unit.

For example, the display control unit 82 causes, with respect to each enemy unit selected by the enemy unit selecting unit 76, the guide image, which is based on the parameter information corresponding to the enemy unit and on the parameter information corresponding to the moving instruction object player unit, to be displayed at the position on the game screen based on the position of the enemy unit (display position of the enemy unit image or the position of the enemy unit object). For example, the guide image may contain a message image based on the parameter information corresponding to the enemy unit and on the parameter information corresponding to the moving instruction object player unit. In this embodiment, the guide image is formed as the balloon image containing a message character string in the balloon. Further, the balloon shape is determined based on the parameter information corresponding to the enemy unit and on the parameter information corresponding to the moving instruction object player unit.

Figure 10:
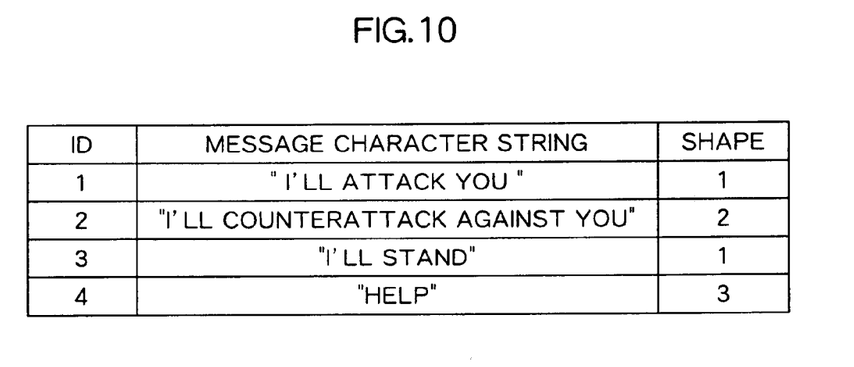
FIG. 10 is a diagram showing an example of a balloon table.

The display control unit 82 according to this embodiment stores a balloon table as illustrated in FIG. 10. The balloon table shown in FIG. 10 includes an ID field, a message character string field, and a shape field. The ID field stores identification information (ID) for uniquely identifying the balloon image. The message character string field stores message character string data. The shape field stores information for specifying the balloon shape. Note that in the example in FIG. 10, a shape "1" represents a balloon shape related to, e.g., the balloon image 62e of FIG. 4. Further, a shape "2" represents a balloon shape related to, e.g., each of the balloon images 62a and 62c of FIG. 4. Still further, a shape "3" represents a balloon shape related to, e.g., the balloon image 62b of FIG. 4.

It is to be noted that the display control unit 82 may determine, with respect to each enemy unit selected by the enemy unit selecting unit 76, a display mode of the enemy unit image on the basis of the parameter information corresponding to the enemy unit and on the parameter information corresponding to the moving instruction object player unit. For instance, a color, transparency, etc. of each enemy unit image may be determined based on the parameter information corresponding to the enemy unit and on the parameter information corresponding to the moving instruction object player unit.

Figure 11:
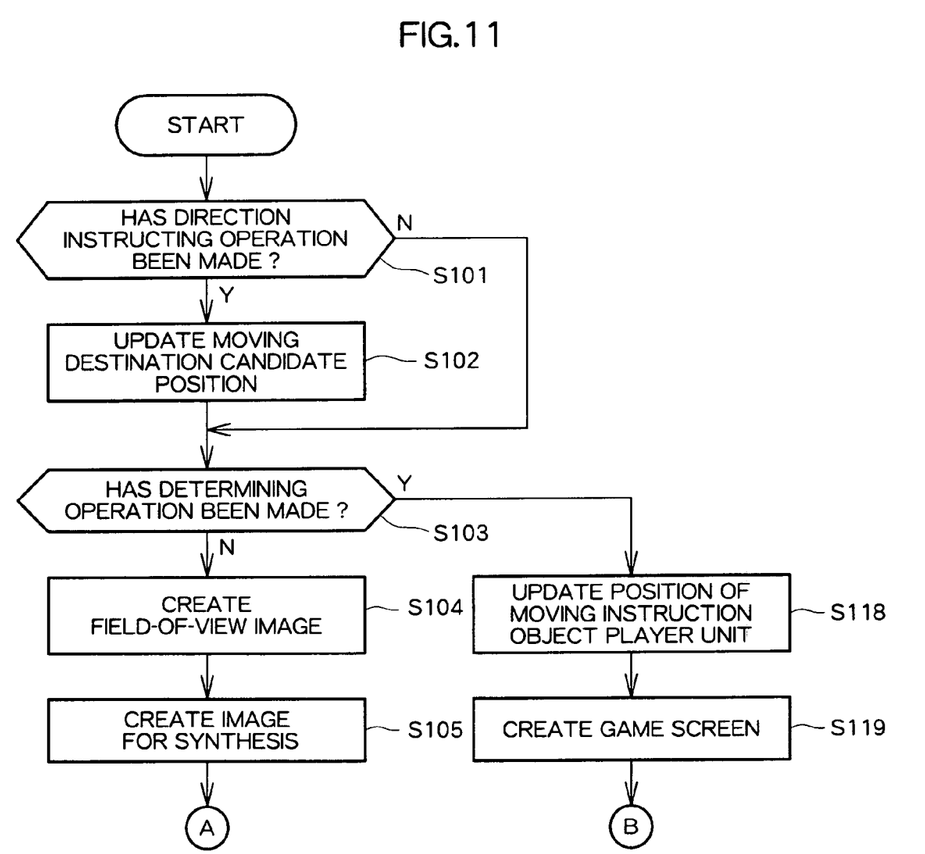
FIG. 11 is a flowchart showing processes executed by the game device.
Figure 12:
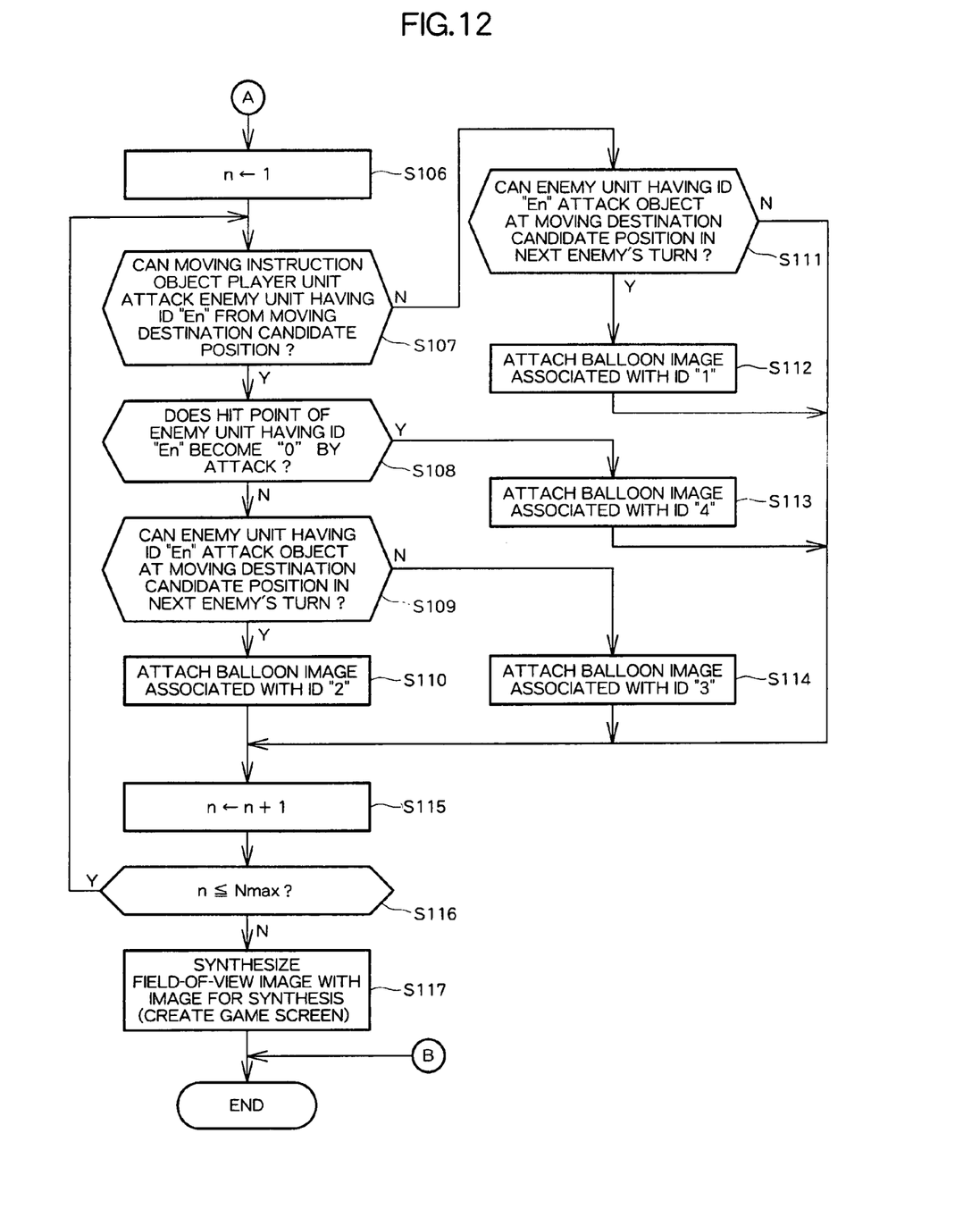
FIG. 12 is a flowchart showing processes executed by the game device.

Given herein is a description of a process executed at an interval of a predetermined period of time (e.g., every $\frac{1}{60}$ sec) in the game device 10. A process of determining the moving destination position of the moving instruction object player unit will be explained herein. In other words, a process executed for displaying the game screen illustrated in FIG. 3 or 4 will be described. FIGS. 11 and 12 are flowcharts each showing the process.

To begin with, as illustrated in FIG. 11, the moving destination candidate accepting unit 74 determines whether the direction instructing operation has been performed or not (S101). This determination is made based on the operation signal inputted from the operation unit 72. For example, the moving destination candidate accepting unit 74 determines whether or not the operation signal indicating the operation of pressing the direction button 34 has been inputted from the operation unit 72.

The moving destination candidate accepting unit 74 updates the moving destination candidate position when determining that the direction instructing operation has been conducted (S102). The moving destination candidate accepting unit 74 stores information for specifying the current moving destination candidate position (which will hereinafter be referred to as moving destination candidate position information). The moving destination candidate accepting unit 74 acquires a content of the direction instructing operation on the basis of the operation signal inputted from the operation unit 72, and sets, as a new moving destination candidate position, the position obtained by shifting the current moving destination candidate position by a predetermined distance in a direction corresponding to the content of the direction instructing operation. Then, the moving destination candidate accepting unit 74 updates the moving destination candidate position information. In this case, the moving destination candidate accepting unit 74 may read the current position and a moving ability parameter of the moving instruction object player unit from the unit data storage unit 80, and set a restriction so that a position to which the moving instruction object player unit cannot move does not become the moving destination candidate position.

Next, the player unit position updating unit 78 determines whether the determining operation has been conducted or not (S103). This determination is made based on the operation signal inputted from the operation unit 72. For instance, the player unit position updating unit 78 determines whether or not an operation signal indicating that the button 38A has been pressed and an operation signal indicating that the button 38A has been released from the pressing, have been inputted from the operation unit 72.

In the case of determining that the determining operation is not performed, the display control unit 82 creates the field-of-view image (S104). In other words, the display control unit 82 creates the field-of-view image obtained by viewing "the virtual three-dimensional space, in which the player unit object and the enemy unit objects are allocated based on the contents (of the current position field) of the unit table", from the given viewpoint.

Further, the display control unit 82 creates the image for synthesis (S105). Specifically, the display control unit 82 creates a full-transparency image for synthesis, which has the same size as that of the field-of-view image. Then, the display control unit 82 attaches the movable range guide image 58 to the image for synthesis. The movable range guide image 58 is rendered so as to indicate the movable range of the moving instruction object player unit on the basis of the current position and the moving ability parameter of the moving instruction object player unit. Further, the display control unit 82 attaches the cursor image 60 to the image for synthesis. A rendering position of the cursor image 60 is determined based on the moving destination candidate position stored in the moving destination candidate accepting unit 74. Moreover, the display control unit 82 attaches the marker image 56 to the image for synthesis. A rendering position of the marker image 56 is determined based on the current position of the moving instruction object player unit.

Next, the enemy unit selecting unit 76 initializes a variable n to "1" (S106).

After that, the enemy unit selecting unit 76 determines whether or not the moving instruction object player unit can attack the enemy unit having the ID "En" from the moving destination candidate position (S107). The enemy unit selecting unit 76 reads an attackable range parameter of the moving instruction object player unit. Further, the enemy unit selecting unit 76 reads the moving destination candidate information stored in the moving destination candidate accepting unit 74. Then, the enemy unit selecting unit 76 acquires, based on those items of information, the attackable range in which the moving instruction object player unit can attack from the moving destination candidate position. Moreover, the enemy unit selecting unit 76 reads the current position of the enemy unit having the ID "En", and determines whether or not the attackable range contains the current position. The enemy unit selecting unit 76, when determining that the attackable range contains the current position, determines that the moving instruction object player unit can attack the enemy unit having the ID "En" from the moving destination candidate position.

The enemy unit selecting unit 76, when determining that the moving instruction object player unit cannot attack the enemy unit having the ID "En" from the moving destination candidate position, determines whether or not the enemy unit having the ID "En" can attack the moving destination candidate position (more precisely, the player unit located in the moving destination candidate position) in the next enemy's turn (S111). The enemy unit selecting unit 76 reads the moving ability parameter and the attackable range parameter of the enemy unit having the ID "En" from the unit table. Then, the enemy unit selecting unit 76 determines, based on those parameters, whether or not the enemy unit having the ID "En" can move to a position enabling the moving destination candidate position to be attacked in the next enemy's turn. The enemy unit selecting unit 76, when determining that the enemy unit having the ID "En" can move thereto, determines that the enemy unit having the ID "En" can attack the moving destination candidate position in the next enemy's turn.

The enemy unit selecting unit 76, when determining that the enemy unit having the ID "En" can attack the moving destination candidate position in the next enemy's turn, attaches a balloon image associated with the ID "1" to the image for synthesis (S112) Herein, the balloon image associated with the ID "1" is an image containing a message character string, which is associated with the ID "1" in the balloon table, in the balloon taking a shape associated with the ID "1" in the balloon table. The enemy unit selecting unit 76 reads the current position of the enemy unit having the ID "En" from the unit table, and determines the display position of the balloon image on the basis of the current position. In other words, the enemy unit selecting unit 76 determines the position on the image for synthesis, which corresponds to the current position, as the display position of the balloon image.

On the other hand, the enemy unit selecting unit 76, when determining in S107 that the moving instruction object player unit can attack the enemy unit having the ID "En" from the moving destination candidate position, determines whether or not the hit point of the enemy unit having the ID "En" comes to "0" due to this attack (S108). The enemy unit selecting unit 76 reads the defending ability parameter and the hit point (a hit point residual quantity) of the enemy unit having the ID "En". Further, the enemy unit selecting unit 76 reads the attacking ability parameter of the moving instruction object player unit. Moreover, the enemy unit selecting unit 76 calculates a quantity of damage by the attack (the hit point reduction quantity) by comparing the defending ability parameter of the enemy unit having the ID "En" with the attacking ability parameter of the moving instruction object player unit. Then, the enemy unit selecting unit 76 determines whether or not the hit point reduction quantity is equal to or larger than the hit point residual quantity of the enemy unit.

The enemy unit selecting unit 76, when determining that the hit point of the enemy unit having the ID "En" becomes "0", attaches a balloon image associated with the ID "4" to the image for synthesis (S113). This process is executed in the same way as the process of S112.

On the other hand, the enemy unit selecting unit 76, when determining that the hit point of the enemy unit having the ID "En" does not become "0" in S108, determines whether or not the enemy unit having the ID "En" can attack the moving destination candidate position (more precisely, the player unit located in the moving destination candidate position) in the next enemy's turn (S109). This process is executed in the same way as the process of S111.

The enemy unit selecting unit 76, when determining that the enemy unit having the ID "En" can attack the moving destination candidate position in the next enemy's turn, attaches a balloon image associated with the ID "2" to the image for synthesis (S110). The process is executed in the same way as the process of S112.

On the other hand, if determining that the enemy unit having the ID "En" cannot attack the moving destination candidate position in the next enemy's turn, the enemy unit selecting unit 76 attaches a balloon image associated with the ID "3" to the image for synthesis (S114). The process is executed in the same way as the process of S112.

The enemy unit selecting unit 76, after executing the processes of S107 through S114 with respect to the enemy unit having the ID "En", increments the variable n (S115). Then, it is determined whether the variable n is equal to or smaller than Nmax or not (S116). Herein, Nmax is a predetermined constant representing a total number of the enemy units. In this embodiment, Nmax is set to "5".

The enemy unit selecting unit 76, when determining that the variable n is equal to or smaller than Nmax, executes the processes of S107 through S114 with respect to the enemy unit having the ID "En". Thus, it follows that the processes of S107 through S114 are executed with respect to all of the enemy units.

Note that the player unit position updating unit 78, when determining that the determining operation is conducted (S103), updates the position of the moving instruction object player unit (S118). In other words, the position specified by the moving destination candidate position information stored in the moving destination candidate accepting unit 74 is stored in the current position field of the moving instruction object player unit of the unit table.

After that, the display control unit 82 creates the game screen in the VRAM (S119). Specifically, the display control unit 82 creates the field-of-view image obtained by viewing "the virtual three-dimensional space, in which the player unit object and the enemy unit objects are allocated based on the contents (of the current position field) of the unit table", from the given viewpoint. Moreover, the display control unit 82 creates a full-transparency image for synthesis, which has the same size as that of the field-of-view image, and attaches the marker image 56 and the cursor image 60 to the image for synthesis. After that, the display control unit 82 creates an image by synthesizing the field-of-view image with the image for synthesis in the VRAM. The image created in the VRAM is displayed on the display unit 84 at the predetermined timing.

The processes described above are realized by executing the game program read from the DVD-ROM 25 with the microprocessor 14.

As described above, according to the game device 10, the balloon image is displayed. Therefore, from the contents and the shapes of the balloon images, the player have an at-a-glance grasp of "to which enemy unit an attack can be made", "whether the hit point of the enemy unit can be zeroed by the attack", "which enemy unit is likely to attack the moving instruction object player unit in the next enemy's turn", and so on when the player unit is moved to the moving destination candidate position. As a result, according to the game device 10, there is no need to check the parameter information (e.g., the hit point, the moving ability parameter, the attacking ability parameter, the attackable range parameter, the defending ability parameter, or the like) of the individual enemy unit, and it is possible to reduce stress felt by the player in the case of determining the moving destination position of the player unit.

It should be noted that the present invention is not limited to the embodiment described above.

For instance, the balloon image may also be displayed in the way of being associated with the player unit other than the moving instruction object player unit, i.e., the player-sided unit (a moving target candidate image). For example, if a player-sided unit exists that generates a game event (e.g., a conversation event and a cooperative attack event) in the relationship with the moving instruction object player unit when the moving instruction object player unit moves to the moving destination candidate position, a balloon image (e.g., the balloon image showing that the conversation and the cooperative attack can be performed) that is associated with the player-sided unit at the timing when the cursor image 60 moves to the moving destination candidate position.

Further, for example, the description has been given with the scheme that the position of the player unit, the position of the enemy unit, the moving destination position, and the moving destination candidate position are managed as positions in the virtual three-dimensional space 64. However, those positions may also be positions on the game screen. In other words, the present invention can be applied to games in which the game screen is displayed by use of two-dimensional graphic technology as well as to the games in which the game screen is displayed by employing three-dimensional graphic technology.

Moreover, for instance, the present invention can be applied to not only simulation games but also other categories of games.

Figure 13:
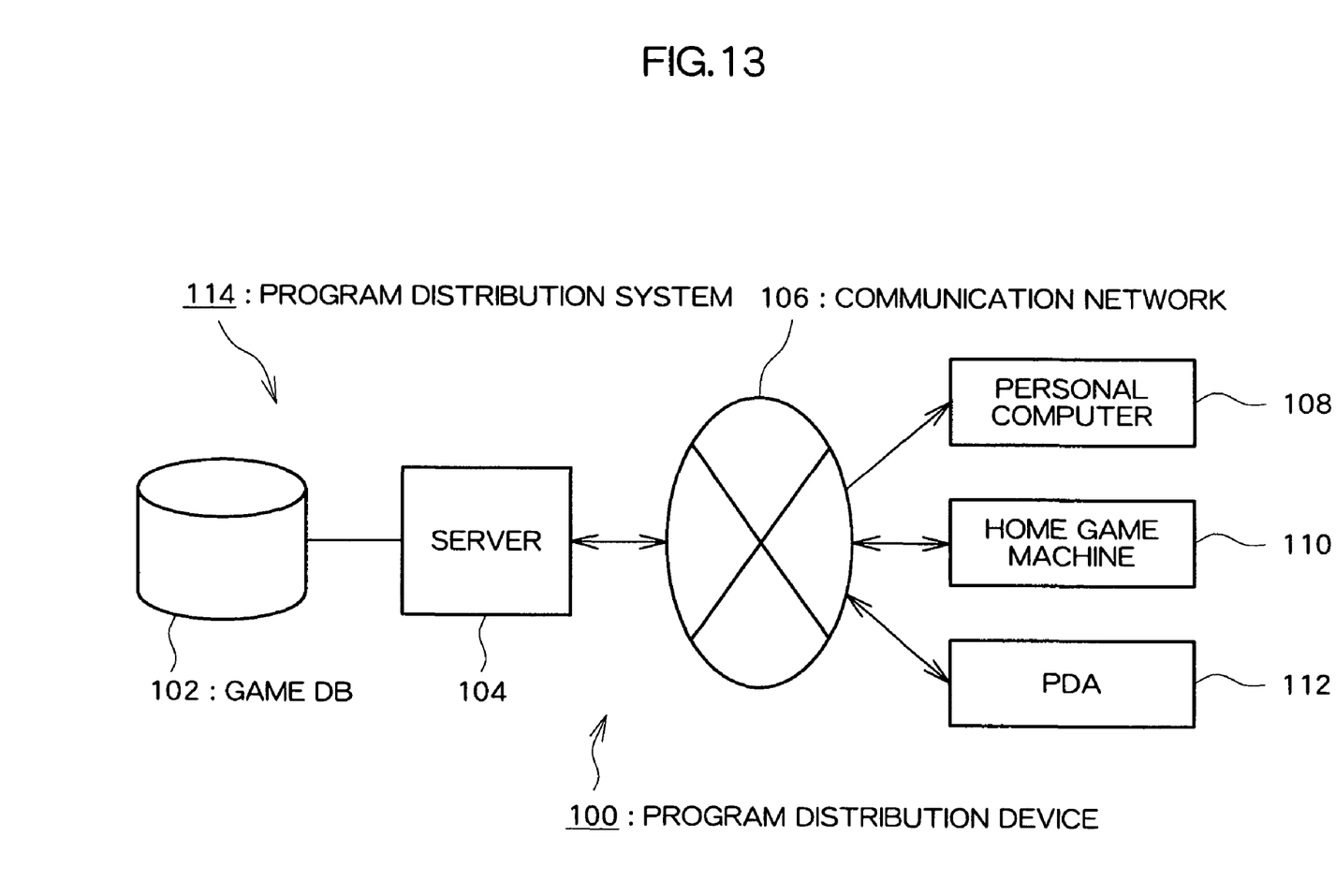
FIG. 13 is a diagram showing the overall structure of a program distribution system according to another embodiment of the present invention.

Still further, in the description given above, the programs are supplied (installed) to the home game machine 11 from the DVD-ROM 25 serving as an information storage medium, and may also be distributed to homes, or the like via the communication network. FIG. 13 is a diagram illustrating the overall structure of a program distribution system using the communication network. A program distribution method according to the present invention will be described with reference to FIG. 13. As illustrated in the figure, a program distribution system 100 includes a game database 102, a server 104, a communication network 106, a personal computer 108, a home game machine 110, and a PDA (personal digital assistants) 112. A program distribution device 114 comprises the game database 102 and the server 104. The communication network 106 includes, e.g., the Internet and a cable TV network. In this system, the game database (information storage medium) 102 stores programs identical to the content stored the DVD-ROM 25. Then, a prospective consumer makes a game distribution request by use of the personal computer 108, the home game machine 110, the PDA 112, or the like, whereby the request is transferred to the server 104 via the communication network 106. Then, the server 104 reads the programs from the game database 102 in response to the game distribution request, and transmits the programs to the game distribution requester, such as the personal computer 108, the home game machine 110, the PDA 112, etc. Herein, the game is distributed in response to the game distribution request. However, the server 104 may transmit the game in a one sided manner. Further, all components of the program necessary to realize a game are not necessarily sent at once (collective distribution), and only a necessary component of the program according to an aspect of the game may be sent (dividing distribution). With a game distributed via a communication network 106 as described, a person in need of the program can readily obtain the program.

The invention claimed is:

1. A game device which displays a game screen containing a moving instruction object image and a moving target candidate image, comprising:
    a moving destination candidate designation accepting unit configured to accept designation of a moving destination candidate position of the moving instruction object image;
    a determining unit configured to determine whether the moving destination candidate position and a position of the moving target candidate image satisfy predetermined conditions; and
    a display control unit that performs a display output associated with the moving target candidate image on the basis of parameter information corresponding to the moving target candidate image and parameter information corresponding to the moving instruction object image, according to a result of the determination made by the determining unit, wherein a guide image is displayed at a position determined based on the position of the moving target candidate image in accordance with the result of the determination by the determining unit,
    wherein the guide image includes a message character string based on the parameter information corresponding to the moving target candidate image and the parameter information corresponding to the moving instruction object image.

2. A game device according to claim 1, wherein the display control unit controls the guide image, which is based on the parameter information corresponding to the moving target candidate image and the parameter information corresponding to the moving instruction object image.

3. A game device according to claim 2, wherein:
    the guide image includes a balloon image with a balloon containing the message character string; and
    the display control unit determines a balloon shape on the basis of the parameter information corresponding to the moving target candidate image and the parameter information corresponding to the moving instruction object image.

4. A game device according to claim 1, wherein:
    a plurality of moving target candidate images is displayed on the game screen;
    the determining unit determines, with respect to each of the plurality of moving target candidate images, whether or not the position of the moving target candidate image and the moving destination candidate position satisfy the predetermined conditions; and
    the display control unit performs a display output associated with each of the moving target candidate images that has been determined to satisfy the predetermined conditions by the determining unit, based on the parameter information corresponding to the moving target candidate image and the parameter information corresponding to the moving instruction object image.

5. A game device according to claim 2, wherein:
    a plurality of moving target candidate images is displayed on the game screen;
    the determining unit determines, with respect to each of the plurality of moving target candidate images, whether or not the position of the moving target candidate image and the moving destination candidate position satisfy the predetermined conditions; and
    the display control unit performs a display output associated with each of the moving target candidate images that has been determined to satisfy the predetermined conditions by the determining unit, based on the parameter information corresponding to the moving target candidate image and the parameter information corresponding to the moving instruction object image.

6. A game device according to claim 3, wherein:
    a plurality of moving target candidate images is displayed on the game screen;
    the determining unit determines, with respect to each of the plurality of moving target candidate images, whether or not the position of the moving target candidate image and the moving destination candidate position satisfy the predetermined conditions; and
    the display control unit performs a display output associated with each of the moving target candidate images that has been determined to satisfy the predetermined conditions by the determining unit, based on the parameter information corresponding to the moving target candidate image and the parameter information corresponding to the moving instruction object image.

7. A control method for a game device which displays a game screen containing a moving instruction object image and a moving target candidate image, comprising:
    accepting by a processor designation of a moving destination candidate position of the moving instruction object image;
    determining in a processor whether the moving destination candidate position and a position of the moving target candidate image satisfy predetermined conditions;
    performing a display output to a display device associated with the moving target candidate image on the basis of parameter information corresponding to the moving target candidate image and parameter information corresponding to the moving instruction object image, according to a result of the determination made in the determining; and
    displaying a guide image at a position determined based on the position of the moving target candidate image in accordance with the result of the determining, wherein the guide image includes the message character string based on the parameter information corresponding to the moving target candidate image and the parameter information corresponding to the moving instruction object image.

8. The control method of claim 7, wherein the performing controls the displaying the guide image, which is based on the parameter information corresponding to the moving target candidate image and the parameter information corresponding to the moving instruction object image.

9. The control method of claim 8, wherein:
    the guide image includes a balloon image with a balloon containing the message character string; and the performing comprises determining a balloon shape on the basis of the parameter information corresponding to the moving target candidate image and the parameter information corresponding to the moving instruction object image.

10. A non-transitory computer-readable information storage medium having recorded thereon a program, when executed by a computer, for making the computer function as a game device which displays a game screen containing a moving instruction object image and a moving target candidate image, the program containing executable instructions comprising:

accepting designation of a moving destination candidate position of the moving instruction object image;

determining whether or not the moving destination candidate position and a position of the moving target candidate image satisfy predetermined conditions;

performing a display output associated with the moving target candidate image on the basis of parameter information corresponding to the moving target candidate image and parameter information corresponding to the moving instruction object image, according to a result of the determination made by the determining; and     displaying a guide image at a position determined based on the position of the moving target candidate image in accordance with the result of the determining,     wherein the guide image includes a message character string based on the parameter information corresponding to the moving target candidate image and the parameter information corresponding to the moving instruction object image.

11. The non-transitory computer-readable information storage medium of claim 10, wherein the performing controls displaying the guide image, which is based on the parameter information corresponding to the moving target candidate image and the parameter information corresponding to the moving instruction object image.

12. The non-transitory computer-readable information storage medium of claim 11, wherein:

the guide image includes a balloon image with a balloon containing the message character string; and     the performing comprises determining a balloon shape on the basis of the parameter information corresponding to the moving target candidate image and the parameter information corresponding to the moving instruction object image.

\* \* \* \* \*